United States Patent [19]
Hanada

[11] Patent Number: 6,129,055
[45] Date of Patent: Oct. 10, 2000

[54] RING BELT

[75] Inventor: Toyohiro Hanada, Higashiosaka, Japan

[73] Assignee: Clasp, Inc., Osaka, Japan

[21] Appl. No.: 09/277,604

[22] Filed: Mar. 29, 1999

[51] Int. Cl.[7] .................................................. A01K 27/00
[52] U.S. Cl. ............................................................. 119/863
[58] Field of Search .................................. 119/769, 792, 119/856, 863, 864

[56] References Cited

U.S. PATENT DOCUMENTS

| | | | |
|---|---|---|---|
| 426,137 | 4/1890 | Nuttall | 119/863 |
| 5,785,010 | 7/1998 | Koch | 119/863 |
| 5,791,297 | 8/1998 | Mudge | 119/865 |

FOREIGN PATENT DOCUMENTS

588308  12/1993  Japan .

*Primary Examiner*—Thomas Price
*Attorney, Agent, or Firm*—Birch, Stewart, Kolasch & Birch, LLP

[57] ABSTRACT

The present invention relates to a ring belt. Locking units are provided in both ends of the ring belt so that they may be removably coupled to each other. An extension is formed to start from the end of the ring belt in which one locking unit is provided to extend along by the inside of the ring. A coupling ring is provided in the top end of the extension for holding a lead or a lifeline. Another coupling ring is also provided in the position corresponding to the coupling ring in the ring belt for holding a lead or a lifeline while both the locking units remain locked together. Such an arrangement enables both these coupling rings to be located in the adjacent positions with both locking units locked together so that the lead may be connected with both coupling rings. This will cause a force from the lead to be transmitted to the extension in such a way that there is no influence of this force on both locking units.

20 Claims, 6 Drawing Sheets

RING BELT

BACKGROUND OF THE INVENTION

1. Field of the Invention

The present invention relates to a ring belt for use in collars for pets such as dogs, belts for building or construction workers, or belts for climbers, and in particular, to a ring belt with a structure that is immune from damage because no force is applied to the locking units in the belt.

2. Description of the Background Art

Figure 5:
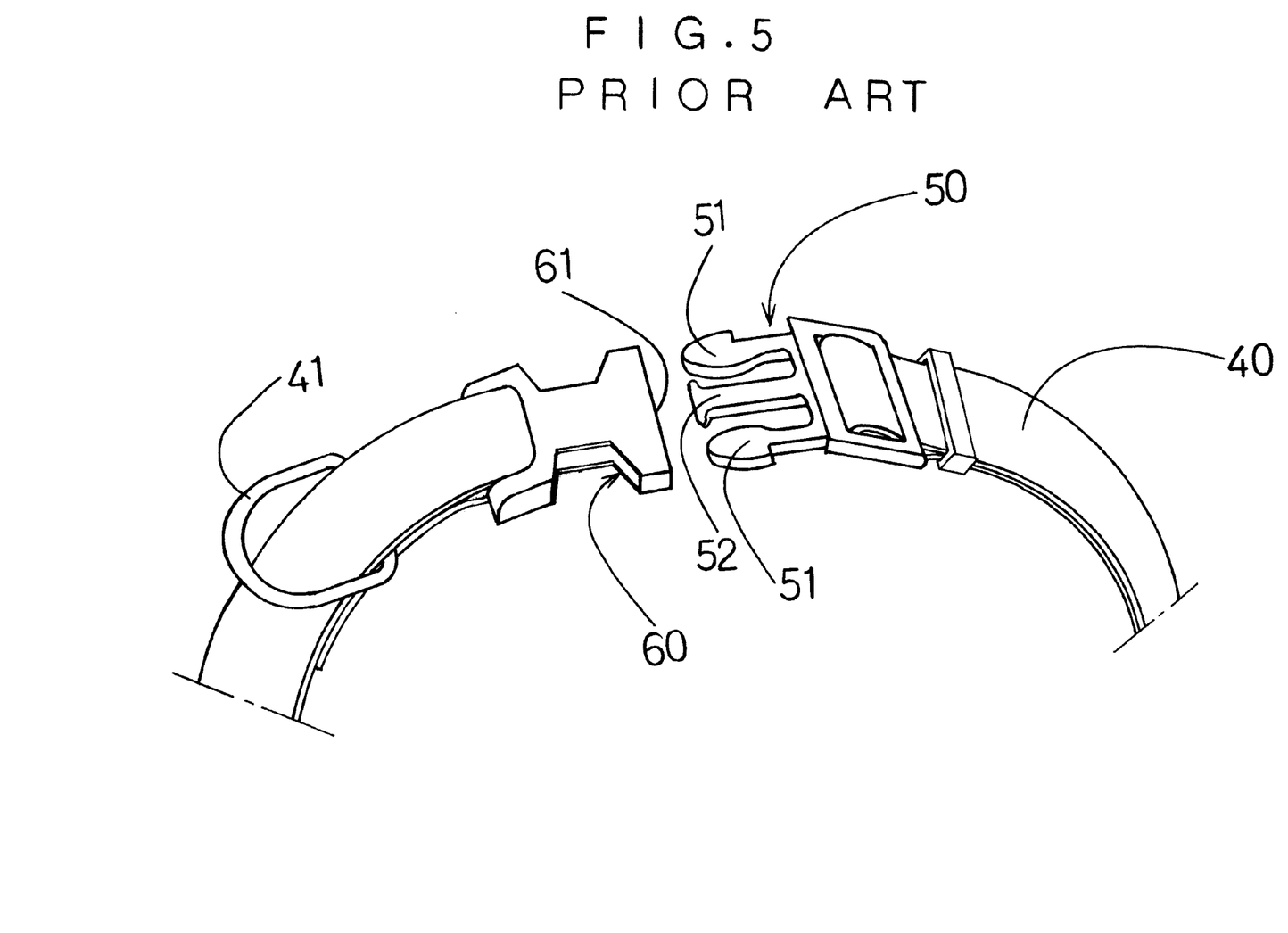
FIG. 5 is a perspective view of the main part of the collar for a pet in accordance with a first prior art.
Figure 6:
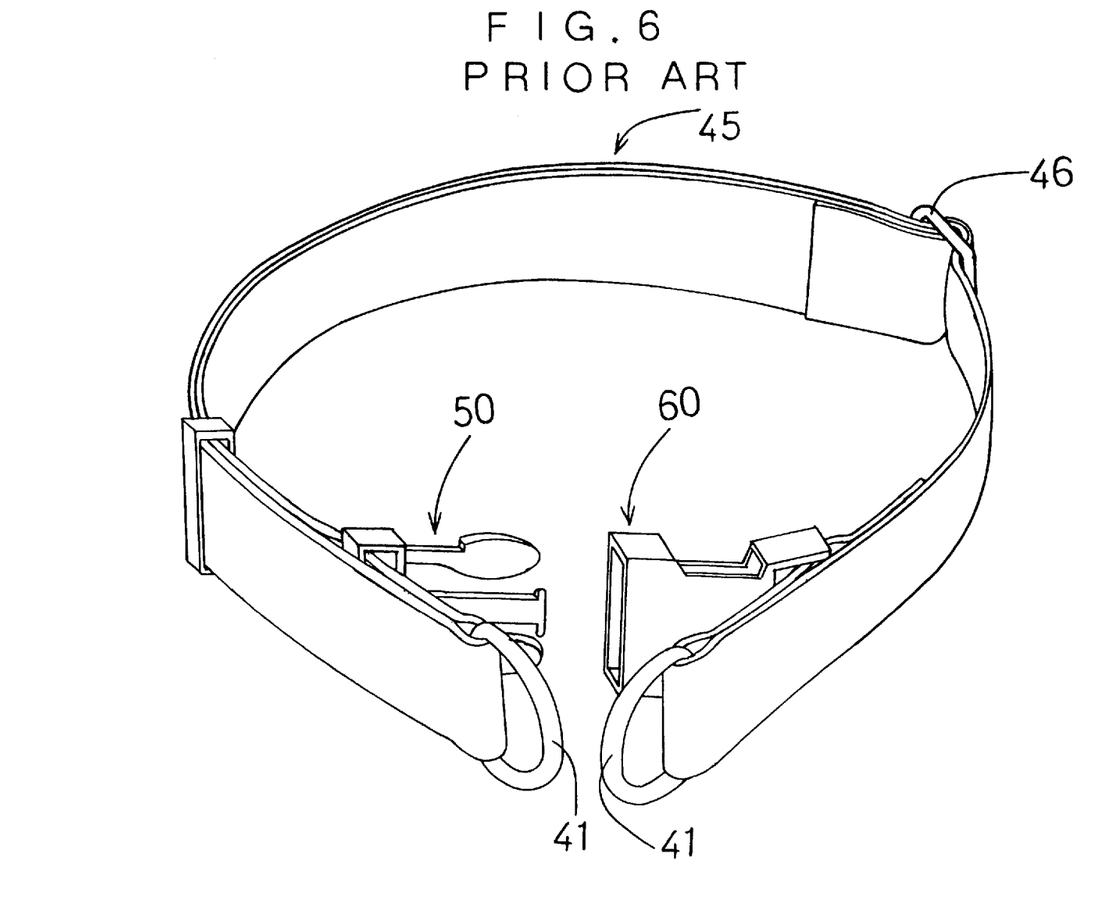
FIG. 6 is a perspective view of an entire collar for a pet in accordance with a second prior art.

FIGS. 5 and 6 illustrate prior art pet collars. FIG. 5 is a view explanatory of the main part of a first prior art, and FIG. 6 is a perspective view showing the entire ring belt of a second prior art.

At present a, one-touch controllable and detachable locking system made of synthetic resin is in use in many fields. This system as shown in FIG. 5 is used as a pet collar for as a convenience.

This prior art locking system comprises a male locking unit 50 attached to one of both ends of ringed belt 40 and a female locking unit 60 attached to the other end.

The male locking unit 50 is provided with insert projections 51, 51 and insert guide 52, and the female locking unit 60 is provided with a receptor 61 for receiving the insert projections 51, 51 and insert guide 52. Both locking units 50, 60 may be removably locked together by inserting the insert projections 51, 51 and insert guide 52 into the receptor 61.

The ringed belt 40 has a coupling ring 41 serving as a coupling member for holding a lead fitted in a proper position.

A problem lies in the fact that said locking system is liable to deteriorate according to the frequency or duration of use because it is made of synthetic resin, whereby this locking system may be broken so that the locking units are disengaged from each other.

For the solution of this problem, the ringed belt as shown in FIG. 6 has been invented and disclosed by the Japanese Utility Model Application laid open No. 5-88308.

The ringed belt 45 is adjustable in the diameter by means of length adjusting member 46, having coupling rings 41, 41 fitted in both ends thereof for holding a lead etc.

One-touch controllable locking units 50, 60 of synthetic resin are mounted in the belt in the inside positions a little far from either end of the belt in which the coupling rings 41, 41 are fitted.

The locking units 50, 60 are fully identical to the first prior art in structure.

In using this belt as, for example a dog's collar, the ringed belt is adjusted in length to the neck size of a dog, and is placed on the dog's neck with the locking units 50, 60 remaining out of engagement with each other, the locking units 50, 60. are joined together, and the ringed belt may fall in position around the dog's neck.

A detachable connecting ring attached to the top end of a lead is linked to both coupling rings 41, 41, and the ringed belt is ready for use.

In the second prior art, if the lead is linked to the ringed belt, a force to pull the lead or a force with which the dog gives the lead a pull is transmitted via the coupling rings 41, 41 to the lead and ringed belt, thus resulting in no influence on the locking units 50, 60. This may, therefore, preclude the risk of the locking units being broken into disengagement one from the other.

In the second prior art, however, though there would be no problem in particular when the ringed belt is used with the lead, with no lead attached to the belt, both end portions of the belt to which the coupling rings 41, 41 are fitted are left hanging loose, and turn out to be an obstacle. This is surely a serious problem. Such loose end portions look extremely unseemly and in fact this ringed belt is not befitting to the pet collar, so it does not meet the consumer's needs.

In this connection, in order to solve such a problem, the present invention is intended to provide a ring belt, such as dog's collar, which looks very attractive, wherein no force is applied to the locking units and no obstacle is attached to the outside of the belt.

In addition to the use for pet collar, said ring belt may be used as a safety or life belt for holding lifelines used by building or construction workers or climbers because no force is applied to the locking units in the belt.

BRIEF SUMMARY OF THE INVENTION

For the solution of said problems, a first invention of the present application provides a ring belt comprising a ring belt 10 which has detachably connectable locking units 50, 60 attached to both ends, and is formed into a circle by joining both the locking units 50, 60 together, and an extension 18 positioned in the interior of said ring belt 10, wherein said extension 18 is connected by its basal end with one end side of the ring belt 10 or the locking unit 60, a coupling member 42 for holding a long-bodied object, such as a lead or a lifeline is provided at the top end of the extension 18, and an another coupling member 43 for holding a long-bodied object, such as a lead or a lifeline is provided in the other end side of the ring belt 10 directly or through the extension 19 positioned in the inside of the ring belt 10, whereby the long-bodied object may be connected with both coupling members while both locking units are kept locked together.

The one end side of the ring belt means a proper position between the center in the length of the ring belt and one locking unit, and the other end side of the ring belt implies a proper position between the center in the length of the ring belt and the other locking unit.

A second invention of the present application provides the ring belt of the first invention, characterized in that the coupling members 42, 43 include through-hole respectively, and said locking unit 50 sitting at the other end side is passed through a through-hole 42h in the coupling member 42 provided in the extension 18 so that the locking unit 50 may be locked to the other locking unit 60.

In any of said first and second inventions, the connection of the long-bodied member, such as a lead or a lifeline, with the coupling members may avoid any possible application of a force which acts to pull the long-bodied member to the locking units, and as there exists no obstacle extending outwardly from the ring belt, the ring belt looks very attractive.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 4(A) and 4 (B) show further embodiments of the coupling member of the ring belt in accordance with the present invention.

DETAILED DESCRIPTION OF THE PREFERRED EMBODIMENT

Figure 1:
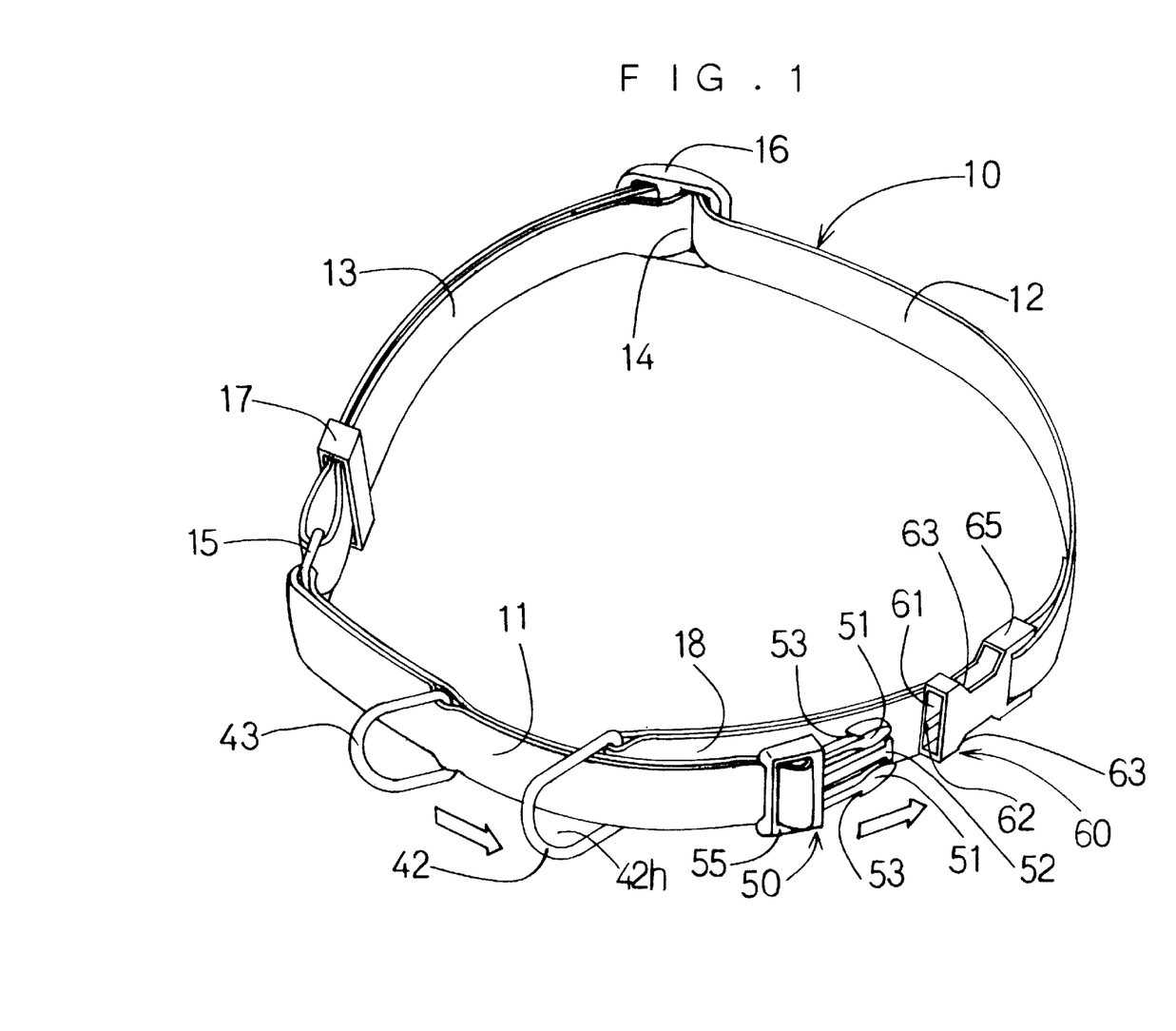
FIG. 1 is a perspective view showing an entire collar for pet in accordance with one embodiment of the present invention, with two locking units kept separate from each other.
Figure 2:
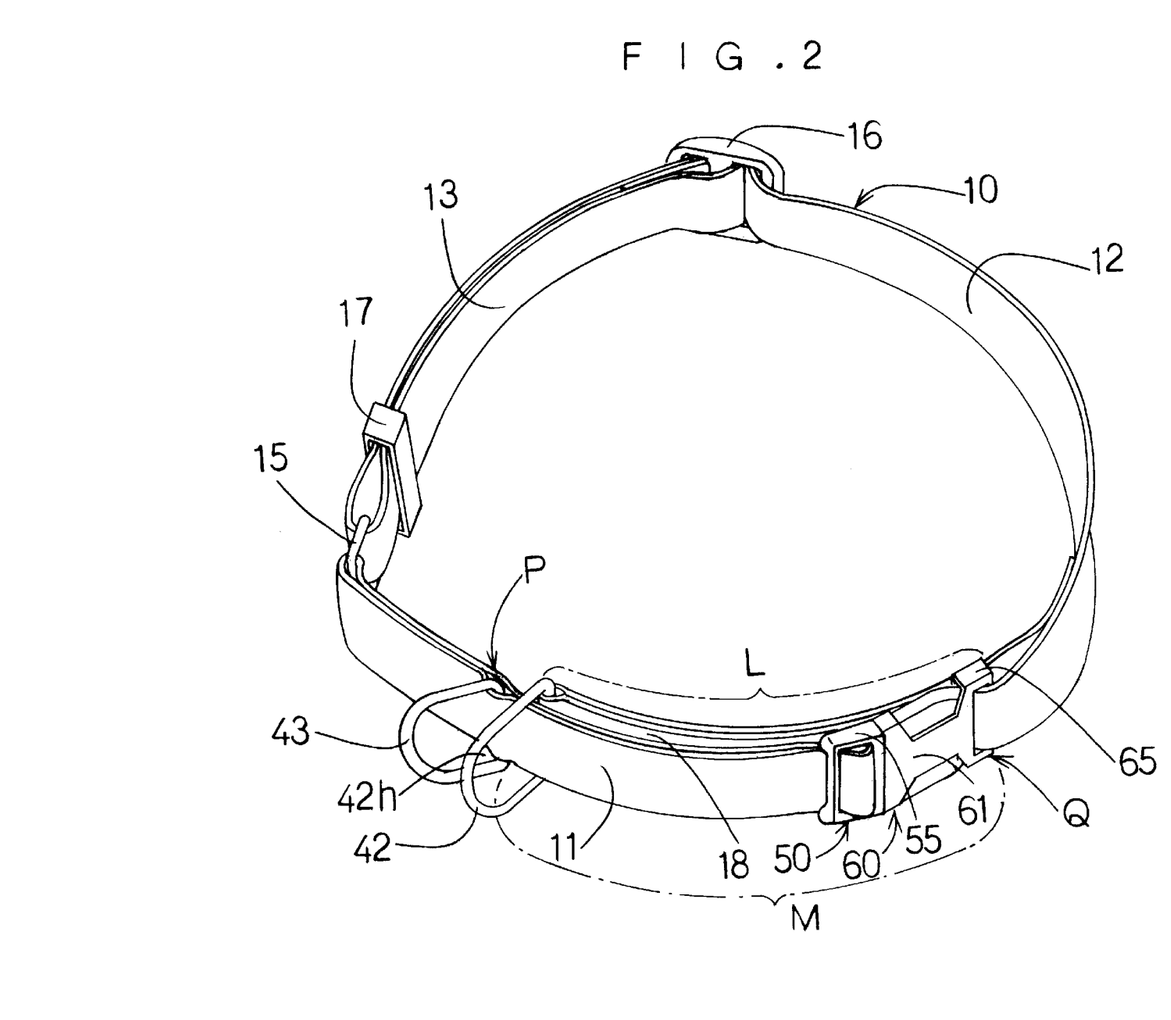
FIG. 2 illustrates said locking units standing interconnected and locked together in the embodiment as shown in FIG. 1.

The preferred embodiments will be described with reference to the accompanied drawings. FIGS. 1 and 2 illustrate a first embodiment of the present invention.

FIG. 1 is a perspective view showing an entire collar for a pet in accordance with said first embodiment of the present invention, with both locking units of the ring belt remaining separated from each other. FIG. 2 is a perspective view showing the entire collar for a pet in accordance with said first embodiment, with both locking units placed in an interconnected and locked position.

A ring belt 10 is a strip made of nylon, comprising one strip member 11 having a male locking unit 50 secured to one end thereof and another strip member 12 including a female locking unit 60.

The strip members 11 and 12 are connected with each other by a coupling ring 15 in a substantially rectangular form.

One end (right-hand end in FIG. 1) of the strip member 11 is provided with the male locking unit 50 made of synthetic resin, and the other end is connected with the strip member 12 by the coupling ring 15. The strip member 11 has a coupling ring 43 mounted directly to a substantially intermediate portion thereof for holding a lead or a leash. The coupling ring 43 and male locking unit 50 can be simply mounted to the strip member 11 by a process comprising the steps of doubling over the strip member 11 and thermo-welding the resultant folded part of the strip member 11.

The strip member 12 includes a coupling ring 42 mounted to one end thereof for holding a lead, and a female locking unit 60 made of synthetic resin mounted to a site at some distance from the position of the coupling ring 42, namely at a distance essentially equal to that between the top end of the male locking unit 50 of the strip member 11 and the position where the coupling ring 43 rests, in such a manner that the female locking unit 60 will be positioned outside of said site.

In other words, a coupling ring 43 for holding a lead etc., is also provided in a position of the ring belt 10 which corresponds to the coupling ring 42 formed at the top end of an extension 18 when both locking units 50, 60 are in an interconnected and locked position, whereby both the coupling rings 42, 43 will be located in adjacent positions when the locking units 50, 60 are joined together so that a lead may be simply connected with these coupling rings 42, 43.

The position in ring belt 10 corresponding to the coupling ring 42, as referred to in the above, implies a position and a nearby area in the ring belt at the other end side agreeing with the place on which the coupling ring 42 is mounted while the locking units 50, 60 are kept interconnected and locked together.

There is provided a length adjusting member 16 for adjusting the length of the ring belt 10 in an almost intermediate section of the strip member 12. The strip member 12 is passed through the length adjusting member 16, then going through the coupling ring 15 positioned at the other end, and doubling back at the latter into a folded part 13, the end portion 14 of which is secured to the length adjusting member 16.

Thus, the strip member 12 is folded back at some proper places, having necessary sections thermo-welded, and holding the coupling ring 42 and female locking unit 60 firmly.

The female locking unit 60 may be formed at the end of strip member 12, from which a separate strip may be extended, whereby the strip interposed between the female locking unit 60 and the coupling ring 42 positioned at the top end provides an extension 18. Design may be made quite freely so that the extension 18 is formed integral with or separate from the strip member 12.

As shown in FIG. 2, the ring belt 10 may be made circular by passing the male locking unit 50 through a through-hole 42h of the coupling ring 42 so as to be connected and locked to the female locking unit 60 until both coupling rings 42, 43 being connected to a lead are put in two adjacent positions so that the connection with the lead can be achieved in an easy manner.

It is important to note that when this ring belt 10 is attached to a collar for a pet, the male locking unit 50 resting at the top end of the strip member 11 is connected and locked to the female locking unit 60 by putting said male locking unit 50 through the through-hole 42h of the coupling ring 42 mounted to the top end of the extension 18 of the other strip member 12. This enables the extension 18 to run along by the strip member 11 to such an extent that the lead may be conveniently and simply connected with coupling rings 42, 43. However, the connection of the male locking unit 50 with the female locking unit 60 can be also performed without passing the male locking unit 50 through the coupling ring 42. This will be discussed below.

Furthermore, for the purpose of the most preferred embodiment, in the state, as shown in FIG. 2, that the male locking unit 50 and the female locking unit 60 are kept interconnected, the length L of extension 18 should be a little shorter than the distance M between a mounting position P for the coupling ring 43 of the ring belt 10 and a mounting position Q for the female locking unit 60, though it does not matter if the lengths L and M are identical to each other.

When the ring belt 10 is used with the coupling rings 42, 43 connected with a lead, such a predetermined length of extension 18 may subject the extension 18 to a tensile force from the lead via the coupling rings, thereby avoiding application of said force to the locking units 50, 60.

Again, in other words, it is most preferable that with the locking units 50, 60 kept interconnected, as shown in FIG. 2, when the lead is connected with the coupling rings 42, 43, the length of the inner part of the ring of from the coupling ring 43 to the coupling ring 42 via the extension 18 be shorter than the length of the entire outer part of the ring plus locking units 50, 60.

This also holds true in other embodiments as described later.

When embodying this invention, the male locking unit 50 may be made securely or removably passed through the coupling ring 42 resting in the top end of the strip member 12. However, in order to avoid any erroneous use by users, it is preferable that the male locking unit 50 be designed not to come off the through-hole of the coupling ring 42 as in the former case. When in actual use, since the ring of the ring belt 10 expands in inner diameter by moving the male locking unit 50 as far as the site of coupling ring 42, the pet's head may go through the ring without difficulty.

The length adjusting member 16 is identical to prior art in structure; its substantially rectangular framework is spanned in the central area thereof by a rod-like body. The strip member 12 is passed through the framework and returned to the centrally positioned rod-like body for fixation to the latter, whereby the length adjusting member 16 may be slid on the strip member 12 in order to adjust the length of the strip member 12, namely to control the length of the ring belt 10.

There is provided near the coupling ring 15 at which the strip member 12 is doubled back a restraint member 17 with a through-hole which is oblong in cross section for restraining possible slipping of the strip member 12.

The male locking unit 50 and female locking member 60 are of a one-touch controllable type as in prior art.

That is, the male locking unit 50 includes a frame body 55 connected with the strip member 11, and insert projections 51, 51 formed at the top end of the frame member 55 to extend in a direction of their insertion and having between the insert projections 51, 51 an insert guide 52 extending in the identical direction.

The female locking unit 60 includes a frame member 65 for holding the end of the strip member 12. The frame member 65 has a receiving portion 61 formed at the top end of the frame member 65 for receiving said insert projections 51, 51 and insert guide 52. The receiving portion 61 has long ridges 62 formed on the inner wall thereof for guidance of said insert guide 52 so that the long ridges 62 may guide the male locking unit 50 as it maintains an engagement relation with long grooves formed on the insert guide 52.

The insert projections 51, 51 each have a proper resiliency, and are provided respectively with gabs 53 protruding upward and downward thereof in FIG. 1. These gabs 53 engage with notches 63 of receiving portion 61 of female locking unit 60, thus resulting in the interconnecting and locking of both locking units 50 and 60.

Both the locking units 50 and 60 may be separated one from the other by disengagement of the gabs 53 from the notches 63 which has resulted from pressing of the insert projections 51, 51 against the central portion side where the insert guide 52 is positioned.

These locking units are the same as the conventional counterparts.

The mounting process for the ring belt 10 to be used as a pet collar is as follows.

A connection between the male locking unit 50 and the female locking unit 60 is undone for separation by pressing the insert projections 51, 51 of the male locking unit 50 in the direction of their central portions.

In an attempt to expand the inner diameter of the ring belt 10 at its maximum, the male locking unit 50 is moved to the length of colliding with the coupling ring 42.

The ring belt is slid onto the dog's nose first, then past the head, then placed in position around the neck, and finally the male locking unit 50 and the female locking unit 60 in the ring belt 10 are interconnected and locked together.

Then, both coupling rings 42, 43 are found to adjoin, so that the detachable coupling ring attached to the top end of a lead can be simply secured to both coupling rings 42, 43.

When removing the ring belt 10 from the dog's neck, said procedure may be made in reverse order.

Figure 3:
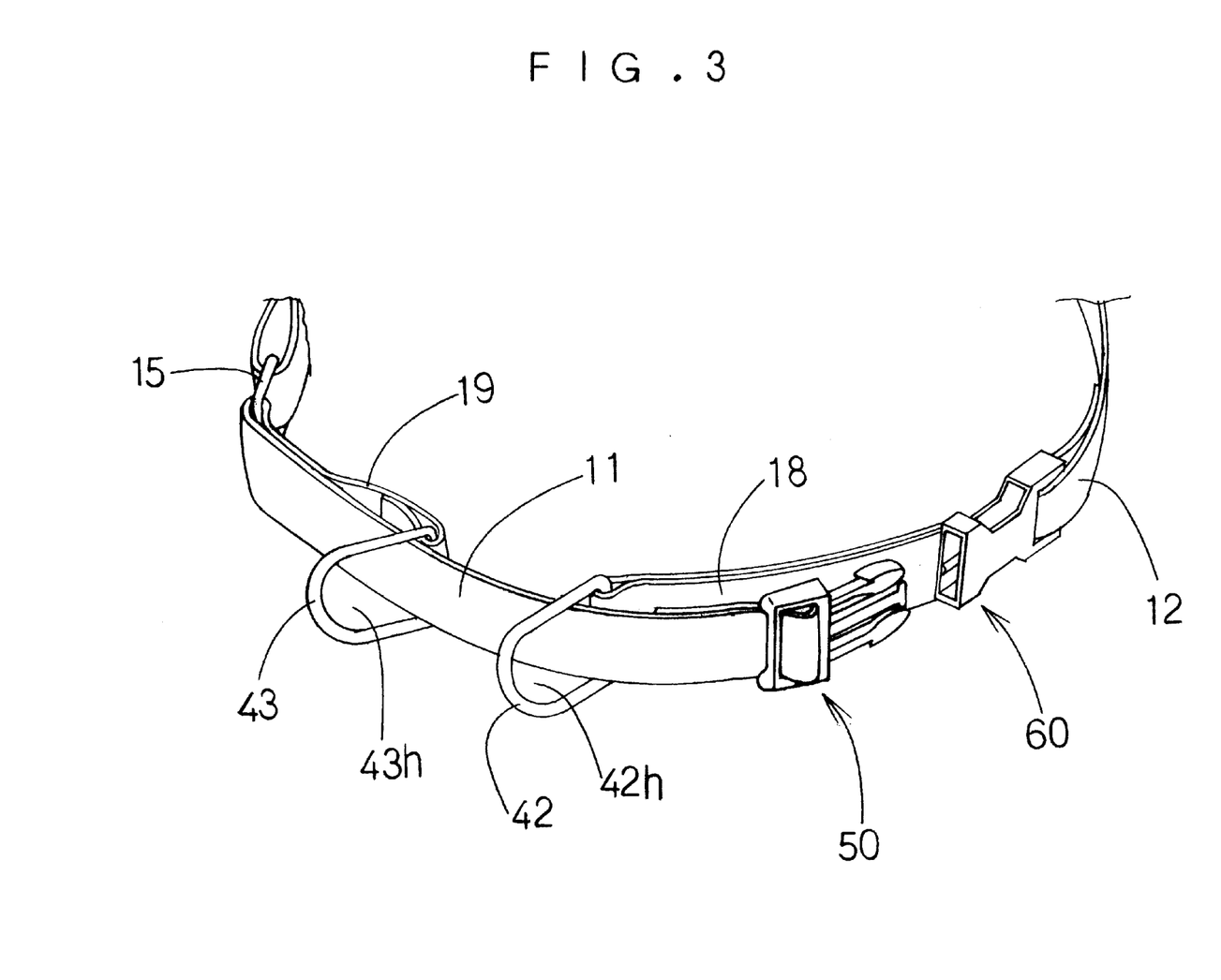
FIG. 3 is a view explanatory of another embodiment in which the manner of mounting a coupling ring 43 in accordance with the embodiment as shown in FIG. 1 is different.

FIG. 3 is a view explanatory of another embodiment where the coupling ring 43 provided on the strip member 11 as in the abovedescribed embodiment has been mounted in a different way.

In FIG. 3, the coupling ring 43 is mounted in the top end of an extension member 19 constituted by a strip positioned in the interior of the ring belt rather than being secured directly to the strip member 11 as in the foregoing embodiment. Moreover, as the extension member 19 is placed inside the ring belt, the strip member 11 is through the through-hole 43h of the coupling ring 43. Such a structure does not permit the extension member 19 to appear outside of the ring belt as well as to hang down.

When both locking units 50, 60 are locked together, both coupling rings 42, 43 comes to sit in the adjacent and substantially one and the same positions, thereby enabling a simple connecting of the lead with the coupling rings 42, 43.

Thus, the coupling ring 43 serving as a coupling member can be mounted not directly but via the extension member 19 on the strip member 11.

Figure 4:
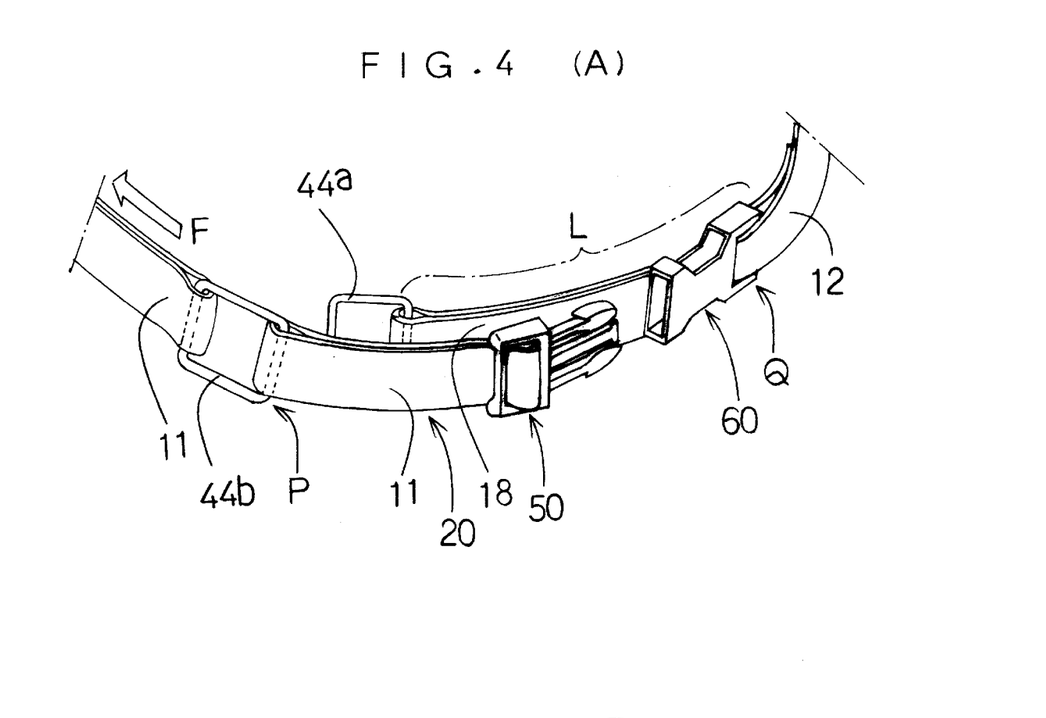

FIG. 4 shows further embodiments of the coupling member in accordance with the present invention, (A) and (B) being perspective views, and in either embodiment, the male locking unit 50 is not arranged to pass through the coupling member fixed to the top end of the extension 18.

The coupling members as shown in FIG. 4(A) each are composed of a ringed object in a substantially rectangular shape, and arranged such that the male locking unit 50 does not pass through a coupling member 44a resting in the top end of the extension 18. On the other hand, a coupling member 44b connected with the strip members 11 by both ends thereof is also formed by a ringed object in a substantially rectangular shape in such a manner that it acts as an intermediary to join both strip members together.

The ring belt 20 so arranged as the above-described may be used as a dog collar in the following manner: it is worn around the neck of a dog, then the male locking unit 50 and the female locking unit 60 are interconnected and locked together, and a lead is connected with the coupling members 44a, 44b positioned in the essentially same place.

In this embodiment, what should be brought to attention is that it is essential to determine the length of the extension 18 in order that if a force is applied in a direction of the arrow F after the locking units 50, 60 have been engaged with each other with a connection with the lead to follow, the force will not be communicated immediately to the interconnected locking units 50, 60 but to the coupling member 44a.

That is, it is important that the length L of the extension 18, or the length of the extension 18 including the coupling member 44a be made shorter than the distance between the mounting position P for coupling member 44b and the mounting position Q for locking unit 60 while the locking units 50, 60 are kept connected with each other.

Each of coupling members as shown by FIG. 4(B) includes a through-hole connectable with a lead. A through-hole 47 is formed in a vertical direction relative to the top end of the extension 18 extending from the strip member 12 along the inside of the ring. The through-hole 47 may be simply produced by folding back the extension 18 consisting of a strip with no thermowelding of the resultant turn-up portions to follow.

The coupling member 48b provided in the strip member 11 also includes another through-hole 47 formed in a vertical direction. It also may be readily produced in two thicknesses of the strip member 11 consisting of a strip with no thermo-welding process added thereafter.

This ring belt 30 may be used as a pet collar if the coupling members 48a, 48b including through-holes 47 respectively are connected with a lead.

As in the previous embodiment, when the ring belt 30 is worn around the dog's neck, it is also important here to determine the length of the extension 18 such that a force, which has been applied in a direction of the arrow F, may be transmitted to the extension 18 via the coupling member 48a but not to the locking members 50, 60. Namely, the length L of the extension 18 should be shorter than the length M of from the coupling member 48b to the mounting position for the locking unit 60.

In the embodiments as shown in FIGS. 4(A) and 4(B), the locking unit is out of engagement with the through-hole of the coupling ring unlike in the first embodiment. Therefore, there might be some risk of the extension 18 hanging down when the ring belt has no lead attached thereto. However, that is an unnecessary anxiety because in accordance with the present embodiment, the extension 18 is disposed in the interior of the ring belt.

However, in an effort to bring the things to perfection, a belt receiving member is provided in the root of a coupling member 44a of the extension 18 or in a position corresponding to the root of the strip member 11. This may completely wipe out the risk of the extension 18 hanging down.

As described above, the design of the coupling members for holding the lead can be changed in different ways, and it matters little whether or not the locking units should be passed through the coupling members.

The embodiments have been discussed so far, but they can be modified as under in this invention.

This specific ring belt can be used as a belt for holding lifelines for construction or building workers, or climbers. In this case, for the convenience of mounting of the belt on the waist, it is desirable that the male locking unit 50 be adapted to be removably engaged in the coupling ring 42.

The strip members 11, 12 can be freely designed in length, width and materials.

In the described embodiments, the extension 18 provides an extension of the strip member 12, but this may be a separate piece attached to and extending from the strip member 12.

The starting position of the extension 18 from the ring belt 10 may be freely set out: the extension 18 may start from the strip member 12 immediately close to the mounting position for the female locking unit 60, or the position a little far from said mounting position relative to the other end, or the root of the female locking unit 60 coupled with the strip member 12.

There is no restriction whatsoever in the structure of the locking units 50, 60: any form is usable so long as they are designed to engage with and disengage from each other.

The male locking unit 50 may change places with female locking unit 60, e.g. locking unit 50 is moved to strip member 12 and locking unit 60 to strip member 11.

The coupling member for holding long-bodied objects, such as leads or lifelines may be of any type other than the ring: nothing matters if the coupling member is such a type as to be able to pass through one of the locking units and one of the strip members. That is, any coupling member will do, so long as it includes a through-hole, which may have a nick or nicks on its periphery, and that an incompletely circular shape.

Alternatively, a coupling member may work in practice if it can not pass through the locking units and strip members.

The a coupling ring 43 serving as coupling member is provided in the strip member 11 itself, but the coupling ring 43 can be mounted through a short strip extending from the strip member 11. In this case, it is also essential that the short strip be fitted on the inside of the ring belt, because such an arrangement does not give rise to any obstacle in the outer side of the ring belt.

Means for fixing the coupling member to the strip member or means for coupling the locking unit with the strip member can be designed quite freely.

The present invention can be embodied without the length adjusting member 16 in particular.

The coupling ring 15 may also be designed freely in structure: any coupling ring will suffice if it can act as a mediator to connect strip members 11, 12

With the ring belts in accordance with the above-described embodiments, the strip member 11, 12, are interconnected by means of the coupling ring 15, but the strip members 11, 12 may be formed not separate from but integral with each other.

The ring belt in accordance with the present invention is characterized by the specific linking method for the strip members and the specific positional relation between the locking units and the coupling rings serving as coupling members.

In short, the ring belt is arranged such that while both locking units are in the interconnected and locked positions, the extension starts from the root of one locking unit to extend along the interior of the ring belt, and one coupling ring provided in the extension is positioned together with the other coupling ring provided in the ring belt in substantially one and the same place.

The extension is by no means obstructive because it is positioned inside the ring belt, and thanks to the specified determination of the length of the extension, a force being applied to the both coupling rings is transmitted to the extension but not to both locking units.

In accordance with the first embodiment of the present invention, with the locking units remaining interconnected and locked together, even if no lead or lifeline is attached to the ring belt, there exist nothing obstructive in the latter, and it looks very clear and fine in its external appearance.

In addition to this good appearance, no force will be applied to the locking units, and so, any trouble such as destruction and removal of the locking units will never occur.

Furthermore, with the locking units remaining locked together, since two coupling members for a lead or lifeline are put in substantially identical positions, the lead can be connected to the ring belt in an easy and simple manner, as compared with conventional ring belts in which the coupling members are left dangling.

In the conventional ring belts, both ends where coupling rings are provided are left hanging loose, and both coupling rings stand separated one from the other, whereby when a lead is linked to the ring belt, it could occur that the lead is linked to one coupling ring but not to both coupling rings. In the present invention, such an occasion will never occur because both the coupling members are positioned in substantially identical places.

An advantage which should not be overlooked is that the coupling and locking of both locking units can be carried out very easily based on said locking units which are located in the exterior of the ring belt.

In the second invention, in addition to the effect of the first invention, there is another effect that by passing the locking unit positioned in one end through the through-hole in the coupling member formed in the other end, the extension in which the coupling member is provided may surely continue extending over the ring belt, and there is not the slightest fear of the extension hanging down even though no lead is linked to the coupling member.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims:

What is claimed is:

1. A ring belt comprising:
    a ring belt which has detachably connectable locking units attached to both ends, and is formed into a circle by joining both the locking units together; and
    an extension positioned in the interior of said ring belt;
    wherein said extension is connected by its basal end with one end side of the ring belt or one of the locking units,
    a first coupling member for receiving a long-bodied object provided at the distal end of the extension, and
    a second coupling member for receiving the long-bodied object provided in the ring belt, said second coupling member being shaped substantially identically to said first coupling member,
    whereby the long-bodied object may be connected with both said first coupling member and said second coupling member, while both locking units are kept locked together.

2. The ring belt according to claim 1, wherein the coupling members each include a through-hole respectively, and one of said locking units is passed through said through-hole in the first coupling member provided in the extension so that the locking unit may be locked to the other locking unit.

3. The ring belt according to claim 1, wherein a distance along said ring belt between said second coupling member and a furthest portion of said locking members is longer than a length of said extension.

4. The ring belt according to claim 1, wherein said ring belt comprises a first belt portion and a second belt portion, and further comprising a connecting member interconnecting said first belt portion with said second belt portion.

5. The ring belt according to claim 4, wherein said second coupling member is attached to said first belt portion at a location between said connecting member and one of said locking units.

6. A ring belt comprising:
    a ring belt member having a first end and a second end;
    a first locking unit attached at said first end of said ring belt;
    a second locking unit attached at said second end of said ring belt, said second locking unit being lockingly engagable with said first locking unit;
    an extension member having a first end and a second end, said first end of said extension member being fixed at said first end of said ring belt;
    a first coupling member attached at said second end of said extension member; and
    a second coupling member attached to said ring belt member, said second coupling member comprising a D-ring, each of said first and second coupling members being configured for attachment of a lead therethrough.

7. The ring belt according to claim 6, wherein said D-ring has a straight portion sewn between overlapping portions of said ring belt member.

8. The ring belt according to claim 6, wherein said first coupling member comprises a D-ring.

9. The ring belt according to claim 6, wherein said first end of said extension member is fixed to said ring belt member at said first end of said ring belt member.

10. The ring belt according to claim 6, wherein said first end of said extension member is fixed to said first locking unit at said first end of said ring belt member.

11. The ring belt according to claim 6, wherein a distance along said ring belt member between said second coupling member and a furthest portion of said first locking member is longer than a length of said extension member.

12. The ring belt according to claim 6, wherein said ring belt member comprises a first belt portion and a second belt portion, and further comprising a connecting member interconnecting said first belt portion with said second belt portion.

13. The ring belt according to claim 12, wherein said second coupling member is attached to said first belt portion at a location between said connecting member and said second locking unit.

14. A ring belt comprising:
    a ring belt member having a first end and a second end;
    a first locking unit attached at said first end of said ring belt;
    a second locking unit attached at said second end of said ring belt, said second locking unit being lockingly engagable with said first locking unit;
    an extension member having a first end and a second end, said first end of said extension member being fixed at said first end of said ring belt;
    a first coupling member attached at said second end of said extension member; and
    a second coupling member formed as a loop in said ring belt member between overlapping portions of said ring belt member, each of said first and second coupling members being configured for attachment of a lead therethrough.

15. The ring belt according to claim 14, wherein said first coupling member comprises a loop formed in said extension member between overlapping portions of said extension member.

16. The ring belt according to claim 14, wherein said first end of said extension member is fixed to said ring belt member at said first end of said ring belt member.

17. The ring belt according to claim 14, wherein said first end of said extension member is fixed to said first locking unit at said first end of said ring belt member.

18. The ring belt according to claim 14, wherein a distance along said ring belt member between said second coupling member and a furthest portion of said first locking member is longer than a length of said extension member.

19. The ring belt according to claim 14, wherein said ring belt member comprises a first belt portion and a second belt portion, and further comprising a connecting member interconnecting said first belt portion with said second belt portion.

20. The ring belt according to claim 19, wherein said second coupling member is attached to said first belt portion at a location between said connecting member and said second locking unit.

* * * * *